Oct. 29, 1935.  M. H. HANSEN  2,019,132
SCALE
Filed Aug. 24, 1933
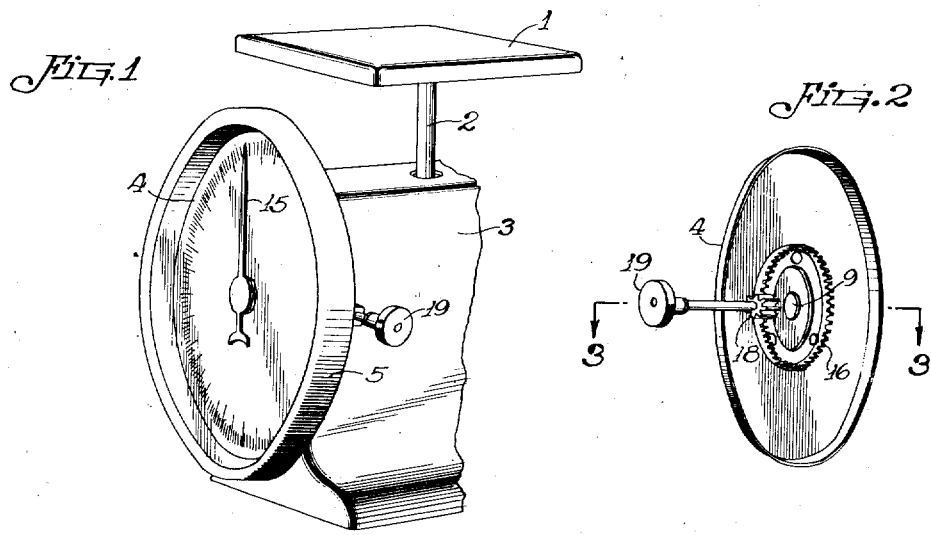
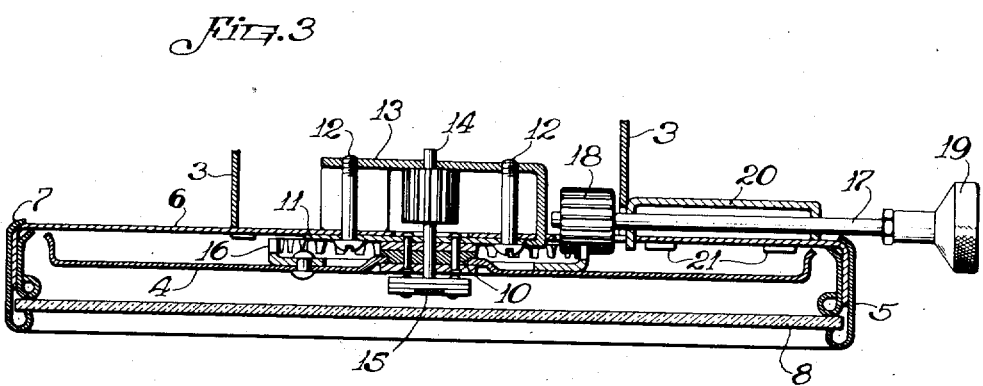
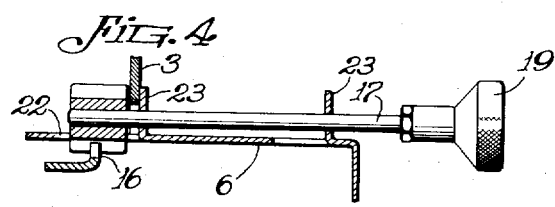
Inventor
Marius H. Hansen
By Crindall Parker Carlson
Attorneys Patented Oct. 29, 1935

2,019,132

UNITED STATES PATENT OFFICE 2,019,132

SCALE

Marius H. Hansen, Chicago, Ill., assignor to Hanson Scale Company, Chicago, Ill., a corporation of Illinois Application August 24, 1933, Serial No. 686,505

2 Claims. (Cl. 116—129)

In dietetic and similar scales, it is customary to use a rotatable dial so that after an empty dish has been placed upon the scale pan the dial may be rotated to bring the zero mark into register with the pointer. The means employed to rotate the dial has been a handle or knob attached to the peripheral portion of the dial. Inasmuch as the handle unbalances the dial, it has been found necessary to use means in the nature of a spring or other friction device to hold the dial in adjusted position. It frequently happens that food is spilled on the dial, the cleaning necessitated thereby resulting in the graduations on the dial being obliterated to a greater or less extent.

The object of the present invention is to provide a construction wherein the dial is located within a glazed frame so as to be fully protected in the event of spillage of food, and wherein means is provided for conveniently rotating the dial to compensate for the weight of an empty container resting on the scale pan, said scale-rotating means being of such nature as to hold the dial in adjusted position without the necessity of providing any special holding means.

In the accompanying drawing,

Figure 1 is a fragmental perspective view of a scale embodying the features of my invention.

Fig. 2 is a perspective view of the rear side of the dial and the means for rotating it.

Fig. 3 is a horizontal sectional view taken in the plane of line 3—3 of Fig. 2.

Fig. 4 shows an alternative means of mounting the dial-adjusting shaft.

In the drawing, 1 is the scale pan, 2 is the stem of the scale pan, 3 is the casing containing the weighing mechanism that supports the stem 2, and 4 is the dial. The dial is rotatably mounted within a circular casing 5 which may be of any desired construction and which is secured to the casing 3. Herein the dial casing 5 is shown as comprising a rear wall 6, a peripheral wall 7 and a glass front 8. The dial 4 has a central opening 9 (Fig. 2) by means of which it is mounted upon a pivot 10. Said pivot is rigidly secured to a plate 11, said plate in turn being rigidly secured to the rear wall 6 by means of two screws 12. These screws also assist in securing a bracket 13 to the rear side of the rear wall 6. In the pivot 10 and the bracket 13 is journaled a pointer shaft 14, a pointer 15 being fixed to said shaft in the space between the dial 4 and the glass front 8. Means of any preferred character is employed to connect the weighing mechanism to the shaft 14 for the purpose of turning the pointer 15 in accordance with the weight placed on the scale pan 1.

The means for turning the dial 4 comprises a crown gear 16 rigidly attached to the rear side of the dial 4 concentric with the axis of the dial. A shaft 17 is journaled upon the rear wall 6 of the dial casing, said shaft in this instance being arranged in a horizontal position. On the inner end of the shaft 17 is fixed a pinion 18 that meshes with the crown gear 16. On the outer end of the shaft 17 is a finger knob 19. When an empty dish has been placed on the scale pan 1, it will be seen that by rotating the finger knob 19 the dial 4 may be turned as far as may be necessary to bring the zero mark into register with the pointer.

The means for rotatably mounting the shaft 17 may be of any desired construction. In Fig. 3 I have shown a sheet-metal housing 20 which is secured to the rear wall 6 by means of clenched lugs 21 on said housing extending through slots in the rear wall 6. The pinion 18 projects into an opening 22 in the rear wall 6. Endwise displacement of the shaft 17 is limited by contact of the end faces of the pinion 18 with one end wall of said opening and the adjacent wall of the casing 3. In Fig. 4 I have shown the shaft 17 as mounted in bearing lugs 23 struck up from the rear wall 6.

It will be evident that although the dial 4 is completely enclosed and thus well protected against being soiled in case food is spilled, it may be readily adjusted to the desired position by operating the knob 19. There being no handle attached directly to the dial there is nothing to unbalance the dial and impart to it a tendency to gravitate out of adjusted position, but if there were any such tendency, the friction between the gears 16 and 18 and between the shaft 17 and its bearings would be sufficient to hold the dial in adjusted position.

I claim as my invention:

1. In a scale of the class described, the combination of a scale casing, a relatively thin circular dial case made of sheet-metal and mounted on the front of said casing, a dial rotatably mounted within said dial case, a pointer within said dial case, and means for rotatably adjusting the dial relative to the pointer comprising a crown gear mounted on the rear face of the dial, a pinion meshing with said crown gear, a shaft mounted parallel to and rearwardly of the rear wall of said dial case and extending laterally from the scale casing and beyond said dial case with the pinion mounted on the inner end of said shaft within the scale casing, a finger knob mounted on the outer end of said shaft, and sheet-metal means rigid with said rear wall and having spaced members provided with alined apertures in which said shaft is journalled, the rear wall of the dial case being apertured inside of the scale casing to permit the pinion to enter the dial case and mesh with the crown gear.

2. In a scale of the class described, the combination of a casing, a relatively thin dial case having a sheet-metal rear wall attached to said casing and a glass front wall, a dial and a pointer rotatably mounted within said dial case, and means for adjusting said dial relative to the pointer comprising a gear mounted on the rear face of the dial, a pinion meshing therewith, a shaft mounted parallel to and rearwardly of said rear wall having the pinion mounted on one end and a finger knob mounted on the other end, and a pair of spaced tangs punched from and bent rearwardly from said rear wall for rotatably supporting said shaft, the aperture in the rear wall left by punching one of said tangs providing an opening through which the pinion enters the dial case to mesh with the gear.

MARIUS H. HANSEN.